United States Patent
Klein et al.

(10) Patent No.: US 10,442,162 B2
(45) Date of Patent: Oct. 15, 2019

(54) ILLUMINABLE COMPOSITE PANE

(71) Applicant: Saint-Gobain Glass France, Courbevoie (FR)

(72) Inventors: Marcel Klein, Baesweiler (DE); Dirk Doerner, Emmendingen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/780,615

(22) PCT Filed: Mar. 6, 2017

(86) PCT No.: PCT/EP2017/055181
§ 371 (c)(1),
(2) Date: May 31, 2018

(87) PCT Pub. No.: WO2017/153331
PCT Pub. Date: Sep. 14, 2017

(65) Prior Publication Data
US 2018/0370196 A1 Dec. 27, 2018

(30) Foreign Application Priority Data

Mar. 9, 2016 (EP) .................................... 16159456
Mar. 9, 2016 (EP) .................................... 16159469

(51) Int. Cl.
*B32B 17/10* (2006.01)
*B32B 17/06* (2006.01)
(Continued)

(52) U.S. Cl.
CPC ........ *B32B 17/10541* (2013.01); *B32B 3/266* (2013.01); *B32B 5/02* (2013.01);
(Continued)

(58) Field of Classification Search
CPC .. B23B 17/10036; C09D 183/04; G02B 6/001
See application file for complete search history.

(56) References Cited

U.S. PATENT DOCUMENTS

2007/0077099 A1  4/2007 Ota
2007/0098969 A1*  5/2007 Ansems ............ B32B 17/10036
                                              428/212
(Continued)

FOREIGN PATENT DOCUMENTS

DE  20 2004 011577 U1  9/2005
DE  10 2005 036869 A1  2/2007
(Continued)

OTHER PUBLICATIONS

International Search Report for PCT/EP2017/055180 filed on Mar. 6, 2017 on behalf of Saint-Gobain Glass France. dated May 29, 2017. 7 pages. (German original + English translation).
(Continued)

*Primary Examiner* — Fabricio R Murillo Garcia
(74) *Attorney, Agent, or Firm* — Steinfl + Bruno LLP

(57) ABSTRACT

A composite pane is presented. The composite pane includes an outer pane and an inner pane that are bonded to each other via an intermediate layer. The composite pane further includes a light-diffusing glass fiber that is suitable for emitting light by diffusion via its side wall along its extension length. According to one aspect, the glass fiber is arranged, in sections, between the intermediate layer and the outer pane, and is arranged, in sections, between the intermediate layer and the inner pane. According to another aspect, the glass fiber is routed through an opening in the intermediate layer.

23 Claims, 9 Drawing Sheets

Figure 1A:
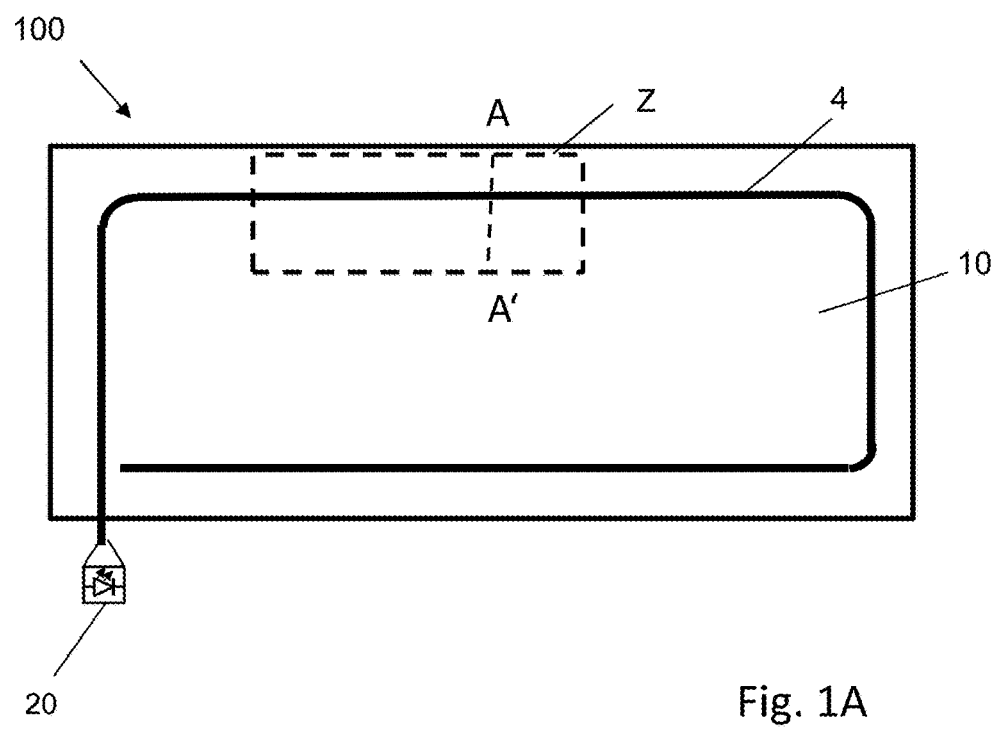

(51) Int. Cl.

| | |
|---|---|
| *F21V 8/00* | (2006.01) |
| *B60Q 3/10* | (2017.01) |
| *B60Q 3/208* | (2017.01) |
| *B32B 5/02* | (2006.01) |
| *B32B 7/12* | (2006.01) |
| *B32B 27/12* | (2006.01) |
| *B60Q 3/64* | (2017.01) |
| *B32B 3/26* | (2006.01) |
| *E06B 3/66* | (2006.01) |
| *E06B 3/673* | (2006.01) |
| *G08B 5/36* | (2006.01) |
| *B60Q 1/26* | (2006.01) |
| *B60J 1/02* | (2006.01) |
| *B60J 1/08* | (2006.01) |
| *B60J 1/18* | (2006.01) |
| *F21S 43/237* | (2018.01) |
| *B60Q 3/50* | (2017.01) |
| *F21S 43/14* | (2018.01) |
| *F21W 102/40* | (2018.01) |

(52) U.S. Cl.
CPC .............. *B32B 7/12* (2013.01); *B32B 17/067* (2013.01); *B32B 17/10036* (2013.01); *B32B 17/1077* (2013.01); *B32B 17/10174* (2013.01); *B32B 17/10761* (2013.01); *B32B 17/10788* (2013.01); *B32B 17/10981* (2013.01); *B32B 27/12* (2013.01); *B60Q 1/268* (2013.01); *B60Q 3/10* (2017.02); *B60Q 3/208* (2017.02); *B60Q 3/64* (2017.02); *E06B 3/66* (2013.01); *E06B 3/673* (2013.01); *F21S 43/237* (2018.01); *G02B 6/001* (2013.01); *G08B 5/36* (2013.01); *B32B 2250/03* (2013.01); *B32B 2250/40* (2013.01); *B32B 2255/20* (2013.01); *B32B 2255/205* (2013.01); *B32B 2260/021* (2013.01); *B32B 2260/046* (2013.01); *B32B 2262/101* (2013.01); *B32B 2307/412* (2013.01); *B32B 2315/08* (2013.01); *B32B 2329/06* (2013.01); *B32B 2419/06* (2013.01); *B32B 2605/006* (2013.01); *B32B 2605/08* (2013.01); *B32B 2605/10* (2013.01); *B32B 2605/12* (2013.01); *B60J 1/02* (2013.01); *B60J 1/08* (2013.01); *B60J 1/18* (2013.01); *B60Q 3/50* (2017.02); *B60Q 2400/20* (2013.01); *B60Q 2400/40* (2013.01); *F21S 43/14* (2018.01); *F21W 2102/40* (2018.01)

(56) References Cited

U.S. PATENT DOCUMENTS

| | | | |
|---|---|---|---|
| 2007/0154705 A1 | 7/2007 | Doeppner et al. | |
| 2007/0227096 A1 | 10/2007 | Schaumberger et al. | |
| 2008/0061789 A1 | 3/2008 | Coates et al. | |
| 2011/0122646 A1 | 5/2011 | Bickham et al. | |
| 2013/0141907 A1* | 6/2013 | Doi .................. | C08J 5/043 362/235 |
| 2013/0299856 A1 | 11/2013 | Verger et al. | |
| 2014/0240997 A1 | 8/2014 | Massault et al. | |
| 2015/0131955 A1 | 5/2015 | Bennett et al. | |
| 2015/0253486 A1 | 9/2015 | Verger et al. | |
| 2015/0349296 A1* | 12/2015 | Mashima .......... | C09J 9/00 257/40 |
| 2016/0054484 A1* | 2/2016 | Kikuchi ............ | G02B 5/0278 362/330 |
| 2017/0135155 A1 | 5/2017 | Klein et al. | |
| 2018/0194113 A1 | 7/2018 | Klein et al. | |
| 2018/0345631 A1 | 12/2018 | Klein et al. | |

FOREIGN PATENT DOCUMENTS

| | | |
|---|---|---|
| DE | 102008004049 A1 | 7/2009 |
| EP | 2025510 A1 | 2/2009 |
| JP | H0513865 B2 | 2/1993 |
| JP | H0687328 A | 3/1994 |
| JP | H11321304 A | 11/1999 |
| JP | 2014504786 A | 2/2014 |
| JP | 2015529935 A | 10/2015 |
| KR | 20060123233 A | 12/2006 |
| KR | 20140037913 A | 3/2014 |
| WO | 2004/082934 A1 | 9/2004 |
| WO | 2005/054915 A1 | 6/2005 |
| WO | 2007/077099 A1 | 7/2007 |
| WO | 2008/061789 A1 | 5/2008 |
| WO | 2016/000927 A1 | 1/2016 |
| WO | 2017/029254 A1 | 2/2017 |
| WO | 2017/153330 A1 | 9/2017 |
| WO | 2017/153331 A1 | 9/2017 |

OTHER PUBLICATIONS

International Search Report for PCT/EP2017/055181 filed on Mar. 6, 2017 on behalf of Saint-Gobain Glass France. dated May 24, 2017. 7 pages. (German original + English translation).

International Search Report for PCT/EP2016/069323 filed on Aug. 15, 2016 on behalf of Saint-Gobain Glass France. dated Nov. 15, 2016. 5 pages. (German original + English translation).

Written Opinion for PCT/EP2016/069323 filed on Aug. 15, 2016 on behalf of Saint-Gobain Glass France. dated Nov. 15, 2016. 10 pages. (German original + English translation).

Non-Final Office Action for U.S. Appl. No. 15/741,244, filed Dec. 30, 2017 on behalf of Saint-Gobain Glass France. dated Jul. 13, 2018. 11 pages.

Canadian Examination Report for 2,992,398 on behalf of Saint-Gobain Glass France, dated Dec. 20, 2018. 3 pages.

International Preliminary Report on Patentability for International Application No, PCT/EP2017/055180 filed Mar. 6, 2017 on behalf of Saint-Gobain Glass France, dated Sep. 11, 2018. 15 pages. (German + English translation).

International Preliminary Report on Patentability for PCT/EP2016/069323 filed on Aug. 15, 2016 on behalf of Saint-Gobain Glass France, dated Feb. 20, 2018. 12 pages. (German + English translation).

Japanese Office Action for Japanese Application No. 2018533619 filed Jun. 25, 2018 on behalf of Saint-Gobain Glass France, dated Jun. 4, 2019, 5 pages.

KIPOs Notice of Preliminary Rejection for Korean Patent Application No. 10-2018-7004016, dated Mar. 2, 2018. 8 pages. (Translation Only).

Russian Official Action for 2018123320 filed on Mar. 6, 2017 on behalf of Saint-Gobain Glass France, dated May 29, 2019. 3 pages. (Translation Only).

Japanese Office Action for Japanese Application No. 2018507564 filed Feb. 13, 2018 on behalf of Saint-Gobain Glass France, dated Feb. 25, 2019, 7 pages.

Russian Official Action for 2018105592 filed on Aug. 15, 2016 on behalf of Saint-Gobain Glass France. 4 pages, dated May 29, 2019 (Translation Only).

Russian Search Report for 2018123320 filed on Aug. 15. 2016 on behalf of Saint-Gobain Glass France. 2 pages, dated May 29, 2019 (Translation Only).

Russian Search Report for 2018123320 filed on Mar. 6, 2017 on behalf of Saint-Gobain Glass France, dated May 29, 2019. 2 pages. (Translation Only).

International Preliminary Report for Patentability for International Application No. PCT/EP2017/055181 filed Mar. 6, 2017 on behalf of Saint-Gobain Glass France, dated Sep. 11, 2018. 7 pages.

Notice of Allowance for U.S. Appl. No. 15/741,244 filed Dec. 30, 2017 on behalf of Saint-Gobain Glass France, dated May 21, 2019. 10 pages.

Notice of Allowance for U.S. Appl. No. 15/741,244 filed Dec. 30, 2017 on behalf of Saint-Gobain Glass France, dated Feb. 13, 2019. 7 pages.

(56) References Cited

OTHER PUBLICATIONS

Written Opinion for International Application No. PCT/EP2017/055181 filed Mar. 6, 2017 on behalf of Saint-Gobain Glass France, dated May 24, 2017. 6 pages. (Translation Only).
Written Opinion for International Application No. PCT/EP2017/055180 filed Mar. 6, 2017 on behalf of Saint-Gobain Glass France, dated May 29, 2017, 13 pages. (German + English translation).

* cited by examiner (a) Preparing a glass fiber (4), a thermoplastic intermediate layer (3), an outer pane (1) with an interior-side surface (II), and an inner pane (2) with an exterior-side surface (III)

(b) Introducing at least one opening (15) in the intermediate layer (3) and routing the glass fiber (4) through the opening (15)

(c) Arranging the intermediate layer (3) between the outer pane (1) and the inner pane (2)

(d) Bonding the interior-side surface (II) of the outer pane (1) to the exterior-side surface (III) of the inner pane (2) via the intermediate layer (3) by lamination.

Fig. 4

ILLUMINABLE COMPOSITE PANE

CROSS REFERENCE TO RELATED APPLICATIONS

The present application is the U.S. national stage of International Patent Application PCT/EP2017/055181 filed internationally on Mar. 6, 2017, which, in turn, claims priority to European Patent Applications No. EP 16159456.9 and 16159469.2 filed on Mar. 9, 2016.

The invention relates to an illuminable composite pane, in particular a windshield, a rear window, a side pane, or a roof panel of a vehicle, as well as a method for production thereof and use thereof.

Composite panes comprise at least one outer pane, one inner pane, and one adherable intermediate layer that areally bonds the outer pane to the inner pane. Typical intermediate layers are polyvinyl butyral films, which have, in addition to their adhesive properties, high toughness and high acoustic damping. The intermediate layer prevents the disintegration of the composite glass pane in the event of damage. The composite pane merely cracks, but remains dimensionally stable.

Composite panes have clear advantages compared to single-pane safety glass: High acoustic insulation can be obtained by means of a composite pane, which is, for example, particularly advantageous for the separation of motor vehicle interiors from their external environment. Consequently, in addition to windshields, side panes of motor vehicles are also increasingly made of composite glass. At the same time, a composite pane has greater penetration inhibition than a single-pane safety glass and is thus more stable against penetration of foreign bodies or break-in attempts.

DE 10 2005 036869 A1, WO 2008/061789 A1, WO 2007/077099 A1, US 2015/253486 A1, and US 2013/299856 A1 disclose composite structures that are areally illuminable by means of woven glass fiber fabric or glass fiber fleece.

The object of the present invention is to provide an improved composite pane that is illuminable, at least in sections. Integration of the illumination into the composite pane should be simple and cost-effective.

The object of the present invention is accomplished by a composite pane in accordance with the present disclosure. Preferred embodiments are also disclosed.

The composite pane according to the invention comprises at least:
  one outer pane and one inner pane that are bonded to one another via an intermediate layer, and
  at least one light-diffusing glass fiber that is suitable for emitting light by diffusion via its side wall along its extension length,
wherein the glass fiber is arranged, in sections, between the intermediate layer and the outer pane and between the intermediate layer and the inner pane and the glass fiber is routed through at least one opening of the intermediate layer.

By means of the arrangement of the glass fiber in at least one opening of the intermediate layer, the position of the glass fiber relative to the intermediate layer is fixed such that slippage of the glass fiber during the production and lamination of the composite pane can be avoided.

In an advantageous embodiment, the composite pane according to the invention is a glazing for means of transportation for travel on land, in the air, or on water, in particular in trains, watercraft, and motor vehicles, for example, as a windshield, rear window, side pane, and/or roof panel, in buildings, in particular in the access area, window area, roof area, or façade area, as a built-in component in furniture and appliances.

In a particularly advantageous embodiment, the composite pane according to the invention is a laminated side pane, which is provided for a, preferably openable, side window of a vehicle. The term "an openable side window" means a side window that can be opened and closed again by substantially vertical displacement of the side pane in the vehicle door.

The terms "outer pane" and "inner pane" serve merely to distinguish a first pane and a second pane. In the case of use of the composite pane as a vehicle pane or as a building pane, the outer pane is preferably but not necessarily turned toward the exterior of the composite pane; and the inner pane, the interior.

The glass fiber according to the invention is a light-diffusing glass fiber that emits light by diffusion via its side wall along its extension length. Such glass fibers are usually made of at least a glass fiber core that is surrounded by one or a plurality of sheath-shaped layers arranged around the glass fiber core. The sheath layers usually have a large number of diffusion centers, for example, nanopores or nanoparticles. Suitable light-diffusing glass fibers are well known to the person skilled in the art. Merely by way of example, reference is made here to the glass fibers mentioned in US 2011/0122646 A1 or US 2015/0131955 A1. The thickness of the glass fiber is typically from 5 µm to 300 µm, preferably from 100 µm to 250 µm. Of course, as a result of suitable production or processing, the glass fiber can also have light-diffusing regions only in sections.

In an advantageous embodiment of the glass fiber according to the invention, the extension length via which the glass fiber emits uninterrupted light via its side wall is at least 5 cm, preferably at least 10 cm, and particularly preferably at least 30 cm.

In the context of the present invention, the term "light-diffusing glass fiber" also means a bundle or braid of a plurality of individual glass fibers. In an advantageous embodiment, the composite pane according to the invention has less than or equal to 50 individual glass fibers, preferably exactly one glass fiber, exactly two glass fibers, exactly three glass fibers, exactly four glass fibers, exactly five glass fibers, exactly six glass fibers, exactly seven glass fibers, exactly eight glass fibers, exactly nine glass fibers, or exactly 10 glass fibers. In particular, the composite pane according to the invention has no glass fiber fleece. The one to 50 glass fibers are preferably controllable independently from one another, in other words, illuminable independently from one another. The one to 50 glass fibers are preferably arranged near one another. Alternatively, the glass fibers can intersect, preferably a maximum of ten times per glass fiber. In an advantageous embodiment of the composite pane according to the invention, the glass fiber is embedded in one surface of the intermediate layer. This can be done automatically during the lamination of the outer pane, intermediate layer, and inner pane since the outer pane and the inner pane are substantially rigid at the temperatures and pressures of lamination and the intermediate layer is soft and flexible.

In the context of the present invention, "opening" preferably means an open point in the intermediate layer that is completely bordered by the intermediate layer. Of course, in a finished laminated composite pane according to the invention, the intermediate layer can close the free region of the opening such that the intermediate layer directly touches the glass fiber routed through the intermediate layer. The opening in the intermediate layer is then filled by the glass fiber.

In an advantageous embodiment of the composite pane according to the invention, the opening is a recess, preferably a circular, elliptical, rectangular, or triangular recess, a punched hole, or a slot, preferably a slot along the extension direction of the glass fiber (in short: longitudinal slot) or a slot perpendicular to the extension direction of the glass fiber (in short: transverse slot).

In an advantageous embodiment of the composite pane according to the invention, the width b of the opening perpendicular to the extension direction of the glass fiber ranges from a single diameter d of the glass fiber up to 40 times the diameter d.

In an advantageous embodiment of the composite pane according to the invention, the width b of the opening perpendicular to the extension direction of the glass fiber is from 0.5 mm to 10 mm, preferably from 1 mm to 5 mm.

In an advantageous embodiment of the composite pane according to the invention, the intermediate layer has at least 2, preferably 3 to 100, openings through which the glass fiber is routed. By means of a large number of openings, the glass fiber is reliably fixed and complex line routing of the glass fiber can be achieved.

In an advantageous embodiment of the composite pane according to the invention, the distance between adjacent openings is from 0.5 cm to 50 cm, preferably from 0.5 cm to 20 cm, particularly preferably from 0.5 cm to 5 cm, and in particular from 1 cm to 3 cm. By means of such a distance between adjacent openings, the glass fiber is reliably fixed and complex line routing of the glass fiber can be achieved.

For the further simplified production of the composite pane, the glass fiber can be fixed in one surface of the intermediate layer before lamination under the action of pressure and temperature. This has the particular advantage that the glass fiber is additionally fixed in its position relative to the intermediate layer during the production of the composite pane and slippage is avoided. The action of pressure and temperature can preferably be produced by a heating element, preferably a soldering iron, a heated pressure roller, a heating plate, in particular a flat iron, or a stream of hot air in combination with a pressing means.

In another advantageous embodiment of a composite pane according to the invention, the glass fiber is connected by at least one fastening means to the intermediate layer, the outer pane, and/or the inner pane. This has the particular advantage that the glass fiber is additionally fixed in its position relative to the intermediate layer during the production of the composite pane and slippage is avoided. The fastening means are preferably transparent such that vision through the composite pane is not or not substantially impaired.

In another particularly advantageous embodiment of a composite pane according to the invention, the fastening means is an adhesive means, preferably an adhesive that is liquid at the time of application, an adhesive tape adhesive on one side (for short: single-sided adhesive tape) or an adhesive tape adhesive on both sides (for short: double-sided adhesive tape). The single-sided adhesive tape or the double-sided adhesive tape consist of a carrier film, preferably a carrier film made of plastic, which has an adhesive on one side or on both sides.

Particularly advantageous adhesives are acrylate adhesives, methylmethacrylate adhesives, cyanoacrylate adhesives, polyepoxides, silicone adhesives, and/or silane cross-linking polymeric adhesives, mixtures, and/or copolymers thereof.

In an alternative advantageous embodiment, the fastening means is a monofilament cord or a braided cord, preferably a transparent cord, particularly preferably a plastic cord, and in particular a cord made of polyamide (for example, nylon)), polyethylene (for example, Dyneema or Spectra), or polyaramide (for example, Kevlar). Such cords have typical diameters from 0.01 mm to 2 mm, preferably from 0.02 mm to 0.1 mm.

The outer pane and/or the inner pane preferably contain glass, in particular soda lime glass, or plastics, preferably rigid plastics, in particular polycarbonate or polymethylmethacrylate. The thickness of the pane can vary greatly and thus be ideally adapted to the requirements in the individual case. Preferably, the thicknesses of the outer pane and of the inner pane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, frosted, or colored. The outer pane and the inner pane can be made of non-prestressed, partially prestressed, or prestressed glass. The outer pane and/or the inner pane can have a masking print, preferably a black print, on one side, which blocks the view of gluing of the pane in a housing or vehicle body or other elements arranged in or on the pane. The masking print can be implemented opaque and full-surface. Alternatively, the masking print can also be implemented semitransparent, for example, as a dot grid, strip grid, or checkered grid. Alternatively, the masking print can even have a gradient, for example, from an opaque covering to a semitransparent covering.

In an advantageous embodiment, the composite pane according to the invention has, at least in sections, a masking print on the outer pane or on the inner pane and, in particular, a black print, with the glass fiber arranged, at least in sections, in the region of the masking print. In the case of an opaque masking print, this has the particular advantage that the glass fiber and any fastening means are not discernible when looking through, and, at the same time, the illumination from the glass fiber is discernible only on one surface of the panes, i.e., on the exterior-side surface of the outer pane or the interior-side surface of the inner pane.

The intermediate layer is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof. The thickness of the intermediate layer and, in particular, of the thermoplastic bonding film is preferably from 0.2 mm to 2 mm, particularly preferably from 0.3 mm to 1 mm, for example, 0.38 mm or 0.76 mm.

In another advantageous embodiment, the composite pane according to the invention has heating means for electrical heating of the composite pane. Preferred heating means are electrically conductive wires and/or one or a plurality of electrically heatable, transparent, electrically conductive layers.

The composite pane according to the invention can have other functionalities besides the heating function effected by the heating means. In an advantageous embodiment, the composite pane has a reflecting coating for the infrared range. Such a coating can be applied on a surface of the outer pane or on a surface of the inner pane, preferably on a surface facing the intermediate layer, in order to protect the coating against corrosion and mechanical action. Alternatively, the coating can be introduced into the composite, in the form of a coated thermoplastic film, for example, made of polyethylene terephthalate (PET). In this case, the coated film is preferably arranged between a first and a second thermoplastic bonding film. IR-reflecting coatings typically have at least one electrically conductive layer. Additionally, the coating can have dielectric layers that serve, for example, to regulate the sheet resistance, to protect against corrosion, or to reduce reflection. The conductive layer preferably contains silver or an electrically conductive oxide (transparent conductive oxide, TCO) such as indium tin oxide (ITO). The conductive layer preferably has a thickness of 10 nm to 200 nm. To improve the conductivity with simultaneously high transparency, the coating can have a plurality of electrically conductive layers that are separated from one another by at least one dielectric layer. The conductive coating can include, for example, two, three, or four electrically conductive layers. Typical dielectric layers contain oxides or nitrides, for example, silicon nitride, silicon oxide, aluminum nitride, aluminum oxide, zinc oxide, or titanium oxide. Of course, these electrically conductive, transparent coatings can also serve for the electrical heating of the pane. The coating preferably has a smaller surface area than the composite pane such that a peripheral edge region with a width of preferably 0.5 mm to 15 mm is not provided with the coating. The conductive coating is thus protected inside the intermediate layer against contact with the surrounding atmosphere, which is advantageous in terms of the prevention of corrosion. The composite pane can also have other uncoated regions, for example, data transmission windows or communication windows.

Another aspect of the invention is a composite pane arrangement, at least comprising:

a composite pane according to the invention, and a lighting means for coupling light into the glass fiber.

The lighting means is preferably arranged on one side edge of the composite pane. In the case of a movable composite pane, such as a side pane that can be opened, the lighting means is preferably connected to the composite pane and likewise arranged movably. Of course, the lighting means can also be installed independent of the composite pane and can be connected to the light-diffusing glass fiber according to the invention via a preferably non-light-diffusing glass fiber.

Advantageous lighting means are, for example, laser diodes, light-emitting diodes (LEDs), or incandescent bulbs, with the invention including any type of light source that is suitable for a respective use. The lighting means according to the invention also include lens systems, mirror systems, reflector systems, or other light guides that can serve for the coupling of the light into the glass fiber according to the invention.

The lighting means can be colored or white. The lighting means can also give off light in the ultraviolet range, so long as the glass fiber or its surroundings can convert the ultraviolet light into visible light. Preferred light colors are red (due to the pronounced signaling effect), green (due to the high sensitivity of the human eye for the green color spectrum), and blue (due to its particularly aesthetic and less dazzling effect).

Of course, a composite pane can have one or a plurality of glass fibers. All glass fibers are preferably jointly coupled to a lighting means or each glass fiber is individually coupled to a lighting means. The glass fiber or the glass fibers can be arranged in the composite pane in any technically possible form, for example, in the edge region, in the center, rectilinearly, curved, or as lettering or as a symbol.

Another aspect of the invention is a method for producing a composite pane according to the invention, at least comprising:

(a) Preparing a glass fiber, an intermediate layer, an outer pane with an interior-side surface II, and an inner pane with an exterior-side surface III, (b) Introducing at least one opening in the intermediate layer and routing the glass fiber through the opening, (c) Arranging the intermediate layer between the outer pane and the inner pane, (d) Bonding the interior-side surface II of the outer pane to the exterior-side surface III of the inner pane via the intermediate layer by lamination.

The lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

In an advantageous improvement of the method according to the invention, in the step (b), the opening is stamped or punched, preferably using a needle, a punch, or a suitably shaped punching tool.

In an advantageous improvement of the method according to the invention, in the step (b), the opening is produced by cutting the intermediate layer, preferably with a scalpel, a blade, a knife, or a laser.

A further aspect of the invention includes the use of the composite pane according to the invention in means of transportation for travel on land, in the air, or on water, in particular in trains, watercraft, and motor vehicles, for example, as a windshield, rear window, side pane, and/or roof panel, in buildings, in particular in the access area, window area, roof area, or façade area, as a built-in component in furniture and appliances.

The composite pane according to the invention is particularly preferably a glazing that is frameless in sections, wherein the light-diffusing glass fiber according to the invention is arranged near the frameless side edges. The light-diffusing glass fiber can also be arranged on an inner side edge, for example, in the region of a cutout made in the glazing such as a skylight in a roof panel.

The composite pane according to the invention is preferably implemented as a stationary glazing, in other words, the glazing is arranged stationary relative to its surroundings and fixed, for example, by section-wise fastening, for example, as a windshield in a vehicle or as a glass partition in a building or in a piece of furniture.

The composite pane according to the invention is alternatively implemented as a movable glazing, in other words, the glazing is arranged movable relative to its surroundings, for example, as glazing arranged movably in a door, such as a side pane in a vehicle door.

Another aspect of the invention includes the use of a lighting means according to the invention in a composite pane arrangement for the identification of an electrical function, preferably a heating function, a movement of the composite pane according to the invention, preferably of an opening or closing side window and/or as a warning function, preferably in the case of a frameless side pane in an opened vehicle door. A preferred use includes the use of the composite pane arrangement for a coming-home function and/or a leaving-home function. Of course, the electrical function which the lighting means identifies is not merely the operation of the lighting means but rather a different function.

Commonly referred to as a "coming-home function" is a function, in which, after leaving a vehicle, the vehicle lighting remains lighted for a certain time and then switches off automatically. This has the purpose of lighting the way from the parking place to the house door, thus making coming home easier as well as keeping the vehicle better visible while getting out.

Commonly referred to as a "leaving-home function" is a function in which, for example, after opening of the vehicle by remote control, the vehicle lighting is turned on to illuminate the way from the house door to the vehicle.

In the following, the invention is explained in detail with reference to drawings and exemplary embodiments. The drawings are schematic depictions and not true to scale. The drawings in no way restrict the invention.

Figure 1B:
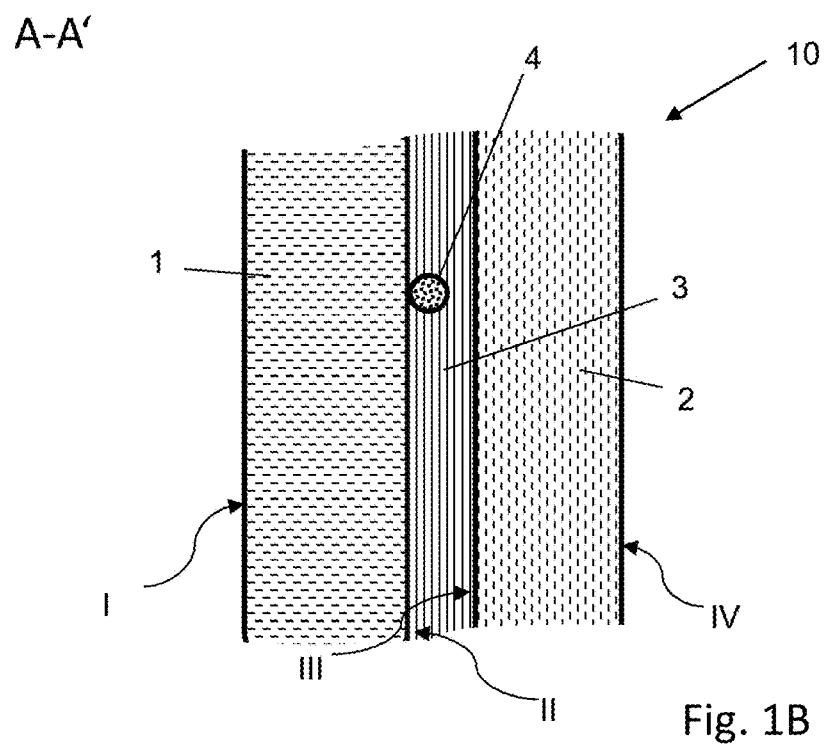
Figure 1C:
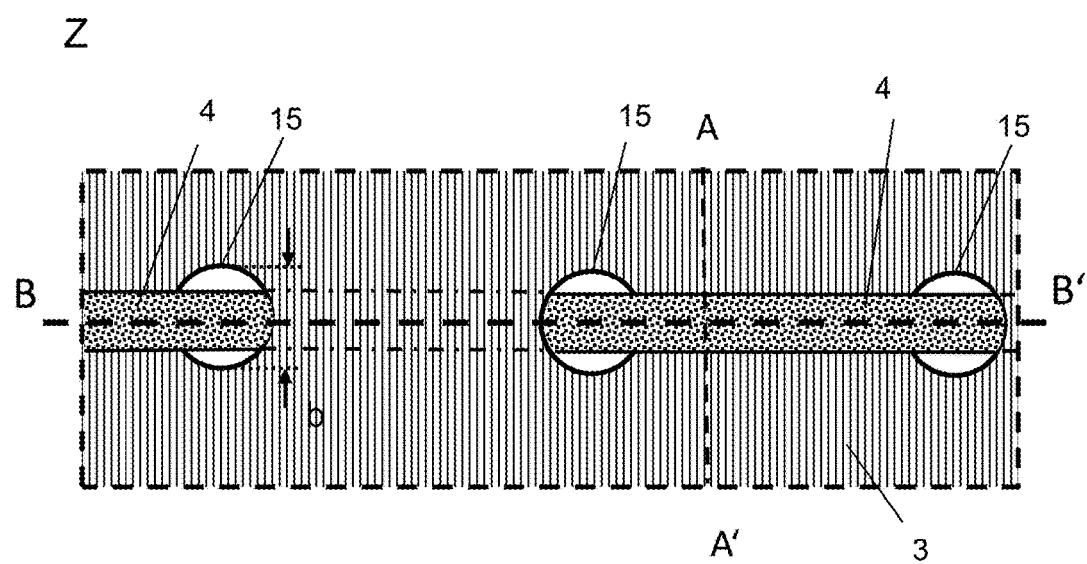
Figure 1D:
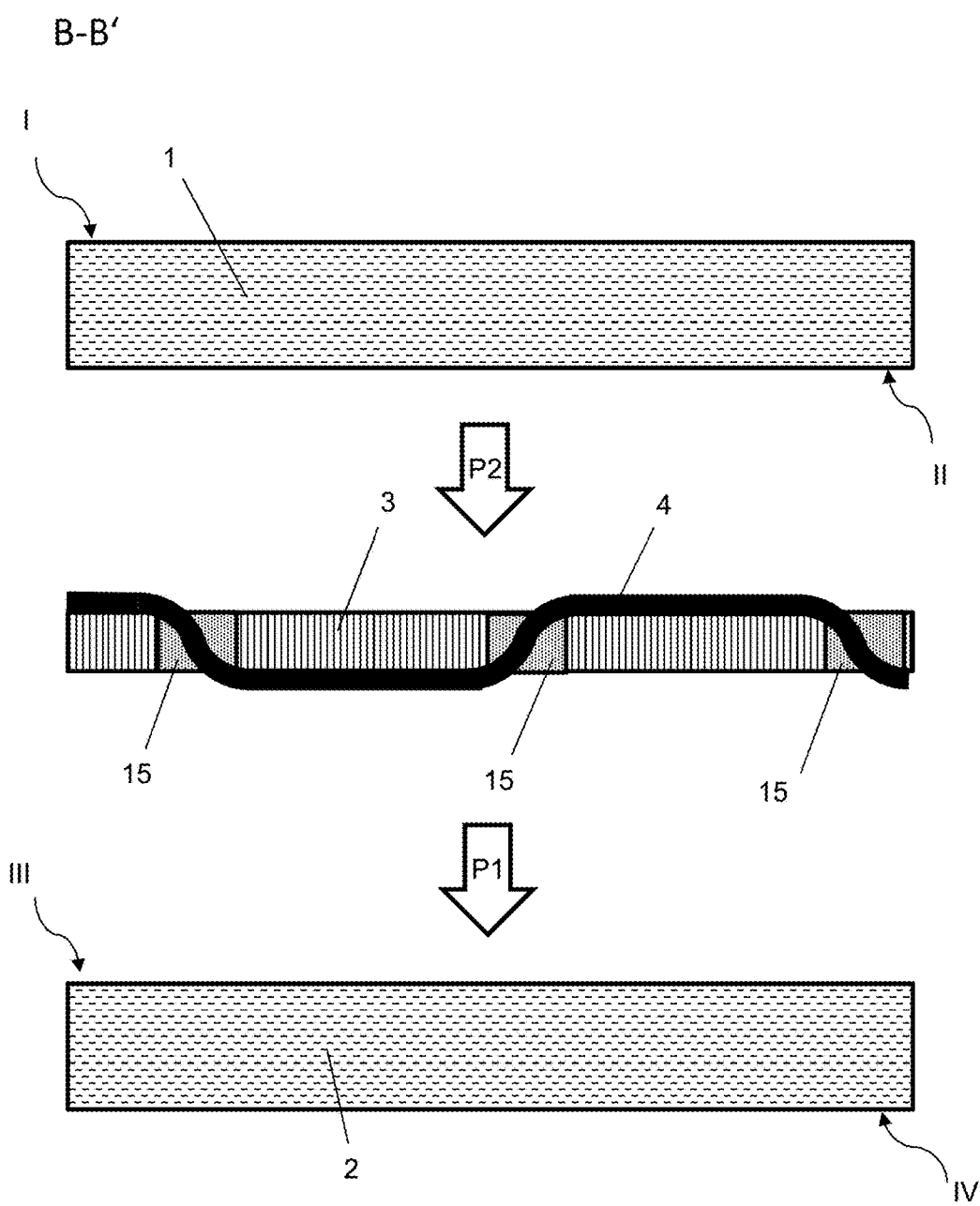
Figure 1E:
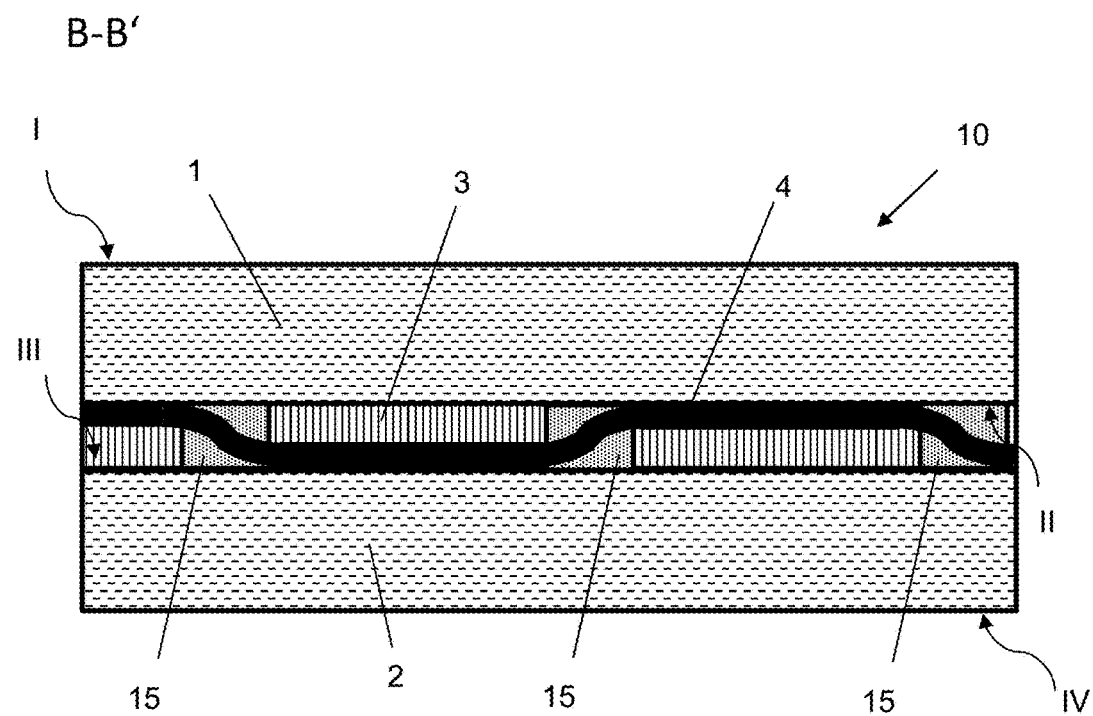
Figure 1F:
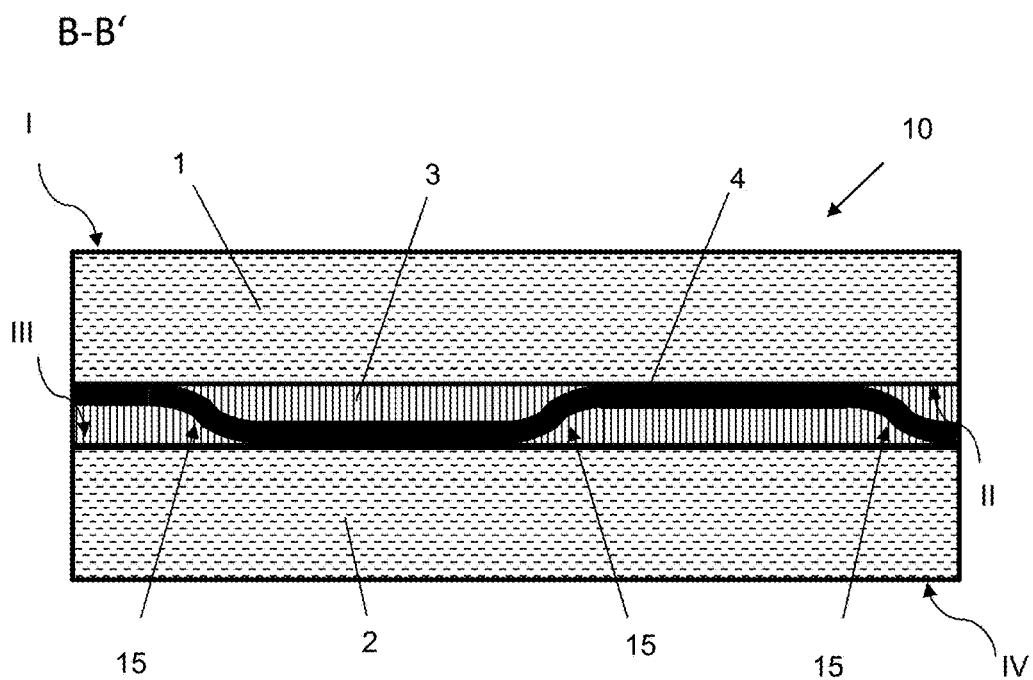
Figure 2A:
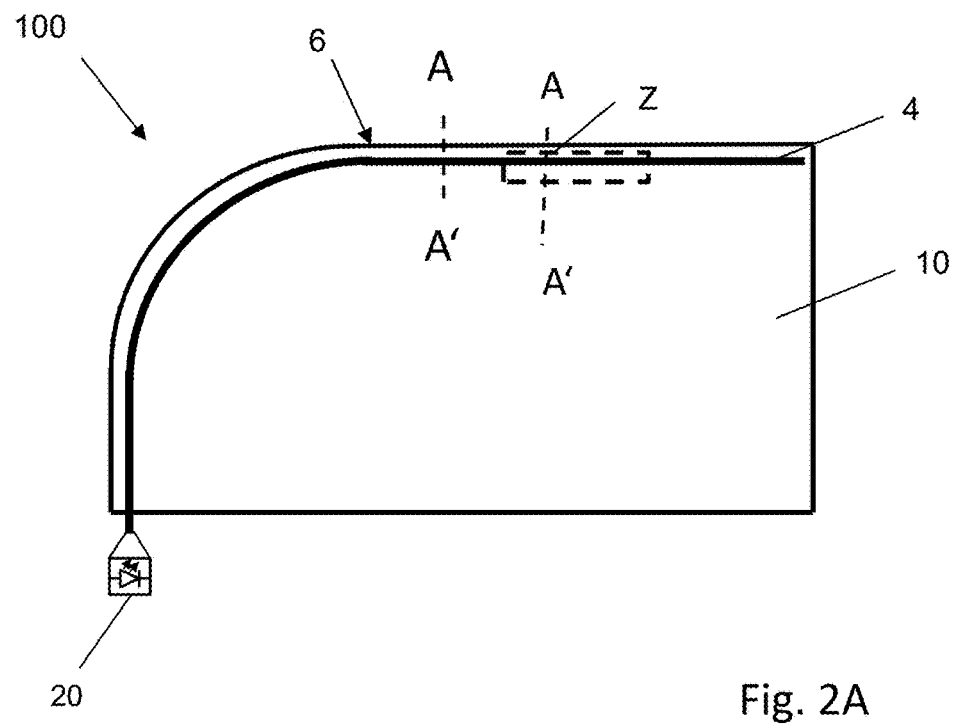
Figure 2B:
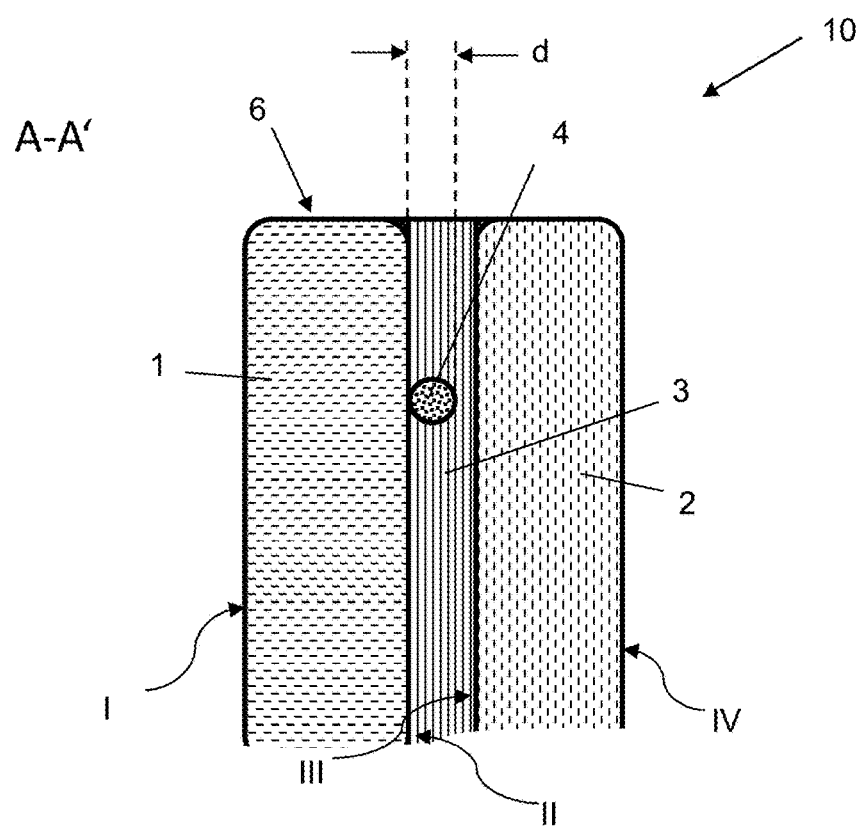
Figure 3A:
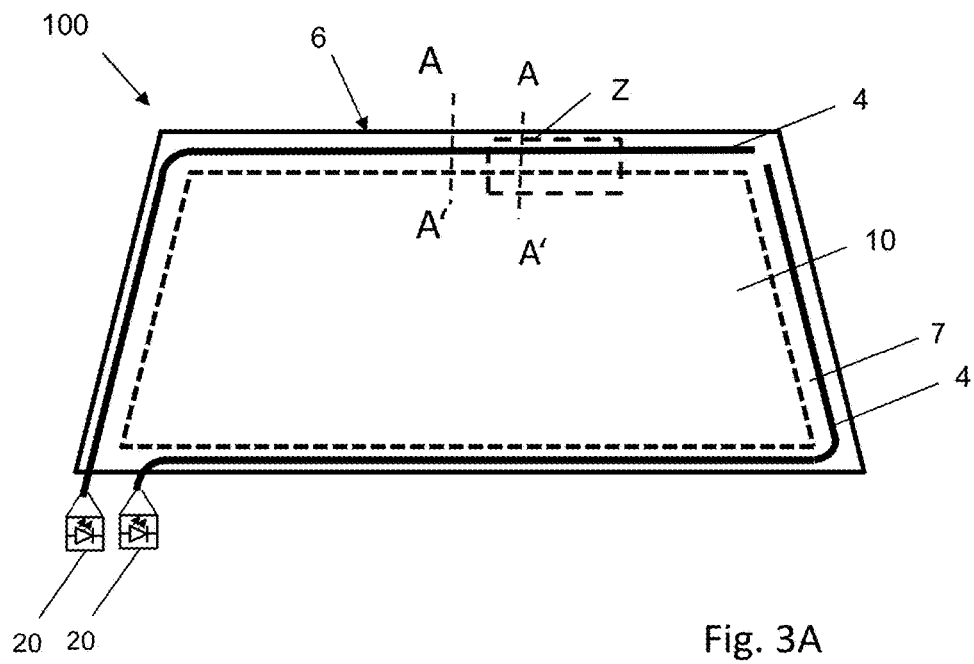
Figure 3B:
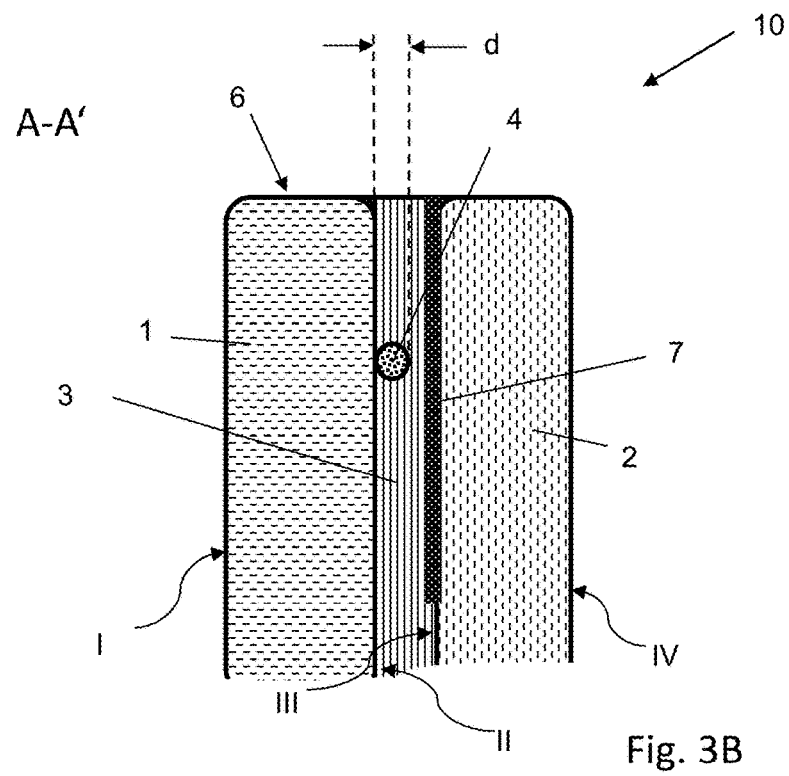
Figure 3C:
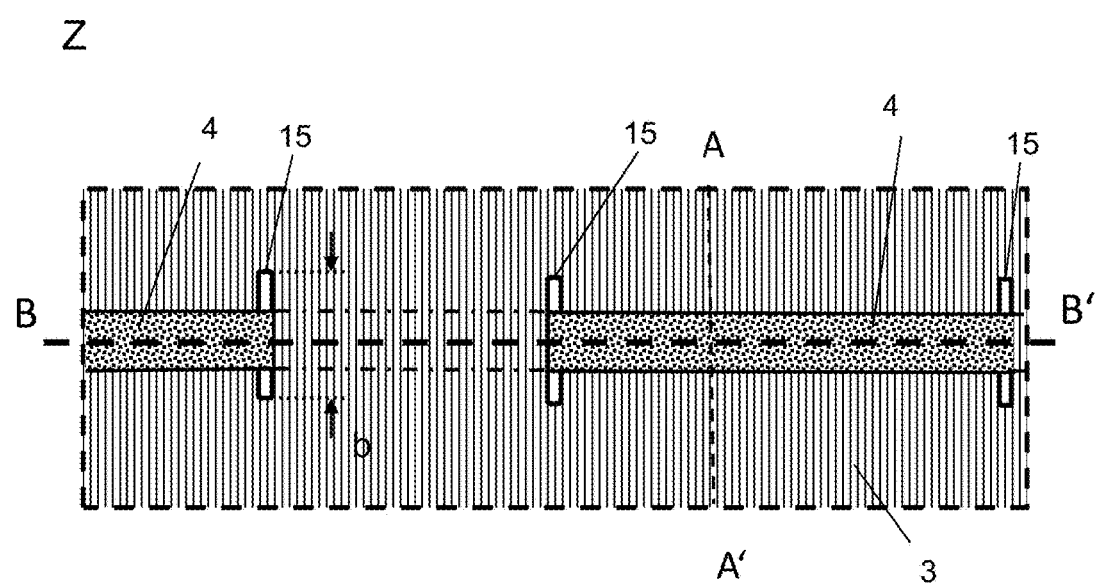

They depict:

FIG. 1A a plan view of an embodiment of the composite pane arrangement according to the invention, FIG. 1B a cross-sectional view along the section line A-A through the composite pane of FIG. 1A, FIG. 1C an enlarged representation of the intermediate layer with glass fiber of the detail Z of FIG. 1A, FIG. 1D a cross-section along the section line B-B' of the detail Z of FIG. 1C, FIG. 1E a cross-section along the section line B-B' of the detail Z of FIG. 1C, FIG. 1F a cross-section along the section line B-B' of the detail Z of FIG. 1C after lamination, FIG. 2A a plan view of an alternative embodiment of the composite pane arrangement according to the invention, FIG. 2B a cross-sectional view along the section line A-A through the composite pane of FIG. 2A, FIG. 3A a plan view of an alternative embodiment of the composite pane arrangement according to the invention, FIG. 3B a cross-sectional view along the section line A-A through the composite pane of FIG. 3A, FIG. 3C an enlarged representation of the intermediate layer with glass fiber of the detail Z of FIG. 3A, FIG. 4 a flowchart of an embodiment of the method according to the invention.

FIG. 1A depicts a plan view of a composite pane arrangement 100 according to the invention, which comprises a composite pane 10 according to the invention and a lighting means 20. FIG. 1B depicts a cross-sectional view along the section line A-A' through the composite pane 10 of FIG. 1A. The composite pane 10 is configured as a roof panel of a passenger car in this example.

The composite pane 10 according to the invention includes an outer pane 1 with an interior-side surface II, an inner pane 2 with an exterior-side surface III, and a thermoplastic intermediate layer 3 that bonds the interior-side surface II of the outer pane 1 to the exterior-side surface III of the inner pane 2 via the pane surface. The outer pane 1 and the inner pane 2 are made, for example, of soda lime glass and have, for example, a thickness of 1.5 mm in each case. The thermoplastic intermediate layer 3 is, for example, a three-ply film made of polyvinyl butyral (PVB) with a total thickness of 0.86 mm. Of course, other glass panes or polymeric panes can also be used as the outer pane and the inner pane. Furthermore, the thickness of the outer pane 1 and the inner pane 2 can be adapted to the respective use.

The glass fiber 4 is, according to the invention, arranged, in sections, between the interior-side surface II of the outer pane 1 and the intermediate layer 3 and, in sections, between the intermediate layer 3 and the exterior-side surface III of the inner pane 2. In the cross-section depicted in FIG. 1B, the glass fiber 4 is arranged between the interior-side surface II of the outer pane 1 and the intermediate layer 3.

The glass fiber 4 has a diameter d of, for example, 200 µm and is suitable for emitting light via its side wall along its extension length. The light is coupled into the glass fiber 4 via one end face of the glass fiber 4. For this, a lighting means 20 is arranged on one end of the glass fiber 4. The lighting means 20 consists, for example, of a laser diode, which can, for example, couple light into the glass fiber 4 via a reflector. Upon application of a voltage to the laser diode, light is then coupled into the glass fiber 4. The glass fiber 4 then diffuses the light on its surface along its entire extension length such that the glass fiber 4 lights up over its entire extension length.

FIG. 1C depicts an enlarged representation of the intermediate layer 3 with glass fiber 4 of the detail Z of FIG. 1A in a plan view of the side of the intermediate layer 3 facing the interior-side surface II of the outer pane 1. In this exemplary embodiment, the intermediate layer 3 has, in the detail Z, three circular openings 15 that were introduced into the intermediate layer 3, for example, by punching. The glass fiber 4 is alternatingly routed over to under and under to over through the openings 15 of the intermediate layer 3. Of course, the intermediate layer 3 also has further openings 15 outside of the detail Z shown here, through which the glass fiber 4 is routed. Such an arrangement according to the invention has the particular advantage that the glass fiber 4 is fixedly connected to the intermediate layer 3 and in the production of the composite pane 10 according to the invention cannot slip in its position relative to the intermediate layer 3.

FIG. 1D depicts the detail Z with the elements of the composite pane 10 before lamination. These include the outer pane 1 with an interior-side surface II and the inner pane 2 with an exterior-side surface III as well as a glass fiber 4 and a thermoplastic intermediate layer 3. For production, first, for example, a plurality of openings 15 are introduced into the intermediate layer 3. For example, in the detail Z depicted, three openings 15 are introduced into the intermediate layer 3. For example, for the entire composite pane 10 of FIG. 1A, 20 openings 15 are introduced into the intermediate layer. Of course, the number of openings 15 can be freely adapted depending on the respective technical conditions, such as, for instance, stiffness of the glass fiber 4, curvature the desired course of the glass fiber 4 in the composite pane 10, etc.

Here, the openings 15 are, for example, circular and are cut out of the intermediate layer 3, for example, by a punch. Of course, the openings 15 can also be slot-shaped, for example, in the shape of longitudinal cuts along the extension direction of the glass fiber 4 or in the shape of transverse cuts perpendicular to the extension direction of the glass fiber 4. Of course, the type of opening 15 can also vary and different types of openings can be combined.

In another process step, the glass fiber 4 is routed through the openings 15 of the intermediate layer 3. The glass fiber 4 is arranged in sections on one side of the intermediate layer 3 and on the other side of the intermediate layer 3 after routing through one of the openings 15.

Of course, the introduction of the openings 15 and the passage of the glass fiber 4 through the intermediate layer 3 can also be done alternatingly. In other words, first, an opening 15 is introduced into the intermediate layer 3, and subsequently, the glass fiber 4 is routed through the opening 15. After that, another opening 15 is introduced into the intermediate layer 3, and the glass fiber 4 is routed through this other opening 15, and so on.

In another process step, the intermediate layer 3 together with the threaded glass fiber 4 is arranged between the outer pane 1 and the inner pane 2. For example, in that the intermediate layer 3 with the glass fiber 4 is arranged on the exterior-side surface III of the inner pane 2 (arrow P1) and, then, the outer pane 1 is arranged with its interior-side surface II on the intermediate layer 3 (arrow P2). Of course, the stack order can also be reversed.

FIG. 1E depicts a cross-section along the section line B-B' of the detail Z of the stack sequence thus produced, before lamination. Since the polymeric intermediate layer 3 is flexible and the glass inner pane 2 and the glass outer pane 1 are largely rigid, the glass fiber 4 penetrates into a region of the respective adjacent surface of the intermediate layer 3.

In another process step, the outer pane 1, the intermediate layer 3, and the inner pane 2 are bonded by lamination under the action of pressure and temperature.

FIG. 1F depicts a cross-section along the section line B-B' of the detail Z of the composite pane 10 according to the invention, after lamination. By means of the action of pressure and temperature during lamination, the thermoplastic intermediate layer 3 is softened such that the glass fiber 4 is embedded in the surface of the intermediate layer 3. At the same time, the openings 15 are filled with the material of the intermediate layer 3 such that the openings 15 are no longer visible or are not substantially visible when looking through the composite pane 10 according to the invention. The opening 15 is consequently reduced in the optimum case to the space occupied by the glass fiber 4 when routed from one side of the intermediate layer 3 to the opposite side of the intermediate layer 3.

FIG. 2A depicts a plan view of a composite pane arrangement 100 according to the invention that includes a composite pane 10 according to the invention and a lighting means 20. FIG. 2B depicts a cross-sectional view along the section line A-A through the composite pane 10 of FIG. 2A. The composite pane 10 is configured in this example as a side pane for a side window of a passenger car.

The composite pane 10 according to the invention includes an outer pane 1 with an interior-side surface II, an inner pane 2 with an exterior-side surface III, and a thermoplastic intermediate layer 3 that bonds the interior-side surface II of the outer pane 1 to the exterior-side surface III of the inner pane 2 to one another via the pane surface. The outer pane 1 and the inner pane 2 are made, for example, of soda lime glass and have, for example, a thickness of 2.1 mm in each case. The thermoplastic intermediate layer 3 is, for example, a film made of polyvinyl butyral (PVB) with a thickness of 0.76 mm. Of course, other glass panes or polymeric panes can also be used as the outer pane and inner pane. Furthermore, the thickness of the outer pane 1 and inner pane 2 can be adapted to the respective use.

Here again, the glass fiber 4 is routed through openings 15 of the intermediate layer. An exemplary detailed representation of the detail Z and of the production method is presented in FIG. 1C through 1F and the associated description.

The light-defusing glass fiber 4 has a diameter d of, for example, 200 µm and is suitable for emitting light via its side wall along its extension length. The light is coupled into the glass fiber 4 via one end face of the glass fiber 4. For this, a lighting means 20 is arranged on one end of the glass fiber 4. The lighting means 20 consists, for example, of a laser diode, which can, for example, couple light into the glass fiber 4 via a reflector. Upon application of a voltage to the laser diode, light is coupled into the glass fiber 4. The glass fiber 4 diffuses the light on its surface along its entire extension length such that the glass fiber 4 lights up over its entire extension length.

Here, the composite pane 10 is, for example, a side pane of a vehicle door of a passenger car, and the glass fiber 4 is arranged near the front and top side edge 6 of the composite pane 10. The border of the side pane in the vehicle door is, for example, frameless such that the side pane is guided and inserted into the vehicle door only at its lower side. Here, the lighting means 20 is, for example, a high-performance light-emitting diode.

The composite pane arrangement 100 produced with this composite pane 10 is, for example, configured such that, upon opening of the vehicle door, the lighting means 20 is activated and the glass fiber 4 is illuminated. This has the particular advantage that the vehicle door is illuminated in the opened state and is particularly well discernible by other road users. The visibility of the composite pane 10 thus illuminated is particularly increased in the darkness—in particular since the composite pane 10 in this example is frameless and is fastened in the vehicle door only at its lower side edge. The side edge of the composite pane 10 illuminated by the glass fiber 4 is thus freely visible without obstruction.

The lighting means 20 can be monochromatic or can identify different states by different colors. Thus, the warning function is particularly high for a red lighting means, since a red color is commonly associated with danger. Green lighting means are readily discerned in the dark since the human eye has a particularly high sensitivity for the green color spectrum.

In another exemplary embodiment, the lighting means 20 has, for example, a red light-emitting diode and a blue light-emitting diode. In that case, the composite pane arrangement 100 is connected, for example, to the vehicle electronic system such that when the composite pane 10 is opened by an electrical window lifter, the glass fiber 4 is illuminated with blue light; and when the composite pane 10 is closed, the glass fiber 4 is illuminated with red light. This has the particular advantage that the direction of movement of the composite pane 10 relative to the doorframe is thus visible and individuals can quickly recognize the danger of entrapment of body parts or objects in the closing window. Of course, other colors or white light can also be used for the illumination of the glass fiber 4. Furthermore, other functions can also be indicated by the illumination of the composite pane 10 or particularly aesthetic lighting can be realized.

Composite panes 10 according to the invention can optionally have an additional electrical function and, for example, an electrical heating function. For example, heating means (not shown here), such as heating wires or heating layers can be arranged in the region between the outer pane 1 and the inner pane 2. Such heating wires are made, for example, of copper or tungsten and have a thickness of, for example, 30 µm. Transparent, electrically conductive coatings, as described above are, for example, known as heating layers. Heating wires and heating layers can be formed, for example, by busbars, for example, strips of a copper foil with a thickness of, for example, 100 µm and a width of, for example, 7 mm. When a voltage is applied to the busbars, a current flows through the heating wires or heating layer, by which means the heating effect is produced. The voltage can be the usual automobile on-board voltage of 14 V, or even a voltage of, for example, 42 V or 48 V. Of course, the voltage can also be a customary supply voltage of, for example, 110 V or 220 V, in particular with the use of a composite pane according to the invention 10 in building technology, such as a transparent heater. The corresponding level of heating of the composite pane 10 can, again, be indicated by the illumination of the glass fiber 4 by the lighting means 20.

FIG. 3A depicts a plan view of an alternative composite pane arrangement 100 according to the invention, which includes an alternative composite pane 10 according to the invention, and a lighting means 20. FIG. 3B depicts a cross-sectional view along the section line A-A through the composite pane 10 of FIG. 3A. In this example, the composite pane 10 is configured as a windshield of a passenger car.

The composite pane according to the invention 10 includes an outer pane 1 with an interior-side surface II, an inner pane 2 with an exterior-side surface III, and a thermoplastic intermediate layer 3 that bonds the interior-side surface II of the outer pane 1 to the exterior-side surface III of the inner pane 2 to one another via the pane surface. The outer pane 1 and the inner pane 2 are made, for example, of soda lime glass and have, for example, a thickness of 2.1 mm in each case. The thermoplastic intermediate layer 3 is, for example, a film made of polyvinyl butyral (PVB) with a thickness of 0.76 mm. Of course, other glass panes or polymeric panes can also be used as the outer pane 1 and inner pane 2. Furthermore, the thickness of the outer pane 1 and the inner pane 2 can be adapted to the respective use.

In this exemplary embodiment, two light-diffusing glass fibers 4 are arranged between the outer pane 1 and the inner pane 2. Here again, the glass fibers 4 are routed through openings 15 of the intermediate layer 3.

FIG. 3C depicts an exemplary detailed representation of the detail Z of the intermediate layer 3 with glass fiber 4 of the detail Z of FIG. 3A. Here, the openings 15 are implemented, by way of example, as slots perpendicular to the extension direction of the glass fiber 4. The width b of the slots is, for example, 5 mm. The further production method is presented, for example, in FIG. 1D through 1F and the associated description.

The light-defusing glass fibers 4 have a diameter d of 150 μm in each case and are suitable for emitting light via their side wall along their extension length. The light is coupled into the glass fiber 4 via one end face of the glass fiber 4. For this, a lighting means 20 is arranged on one end of each glass fiber 4. The lighting means 20 consists, for example, of a laser diode, which can, for example, couple light into the glass fiber 4 via a reflector. Upon application of a voltage to the laser diode, light is coupled into the glass fiber 4. The glass fiber 4 then diffuses the light on its surface along its entire extension length such that the glass fiber 4 lights up over its entire extension length.

The composite pane 10 has, in this example, on a peripheral edge region of the exterior-side surface III of the inner pane 2, an opaque masking print 7, for example, a black print made of a ceramic ink, which forms a permanent bond with the glass surface III of the inner pane 2, by firing. The masking print 7 has the purpose of blocking the view of the gluing points with which the composite pane 10 is glued into a vehicle body. At the same time, the gluing point is protected against light irradiation and, in particular, against irradiation by UV light, which would cause accelerated aging of the gluing point.

The glass fibers 4 are arranged, in this example, in the form of a frame in the edge region of the composite pane 10. The distance from the side edge 6 is, for example, 1 cm to 20 cm.

Here, the glass fibers 4 are, for example, arranged in a region that is covered from the interior-side surface IV of the inner pane 2 by the masking print 7. This means that the glass fibers 4 cannot be seen from the vehicle interior. In particular, light emitted on the sidewalls of the glass fibers 4 also does not enter the vehicle interior such that occupants cannot be dazzled or disturbed thereby.

Here, the lighting means 20 is, for example, a high-performance laser diode. The composite pane arrangement 100 produced with this composite pane 10 is, for example, configured such that the lighting means 20, upon locking or unlocking the vehicle doors, lights the glass fiber 4 for a certain period of time, for example, 1 min. This can occur independent of or simultaneously with the rest of the vehicle lighting. Such illumination can serve as an unambiguous signal to the individual performing the locking and unlocking, for example, using a radio receiver, that the vehicle is securely locked or unlocked. At the same time, a coming-home or leaving-home function can be realized therewith.

The lighting means 20 can be monochromatic or can identify different states by different colors. Different colors permit readily distinguishing visually between locking and unlocking the vehicle. If the illumination of the glass fiber 4 is used as a warning function, a red or orange light can, for example, be used since a red or orange color is commonly associated with danger. Green lighting means are, in particular, readily discerned in the dark since the human eye has particularly sensitivity for the green color spectrum.

Of course, the glass fiber 4 need not be arranged along one side edge of a pane or only along one side edge, but can be arranged in any manner desired. In particular, one or a plurality of glass fibers 4 can be arranged in the shape of a symbol, for example, a hazard triangle, or can form lettering.

Of course, the glass fiber 4 can also have regions in which light can exit the glass fiber 4 via the sidewalls such that symbols not connected to one another can be illuminated.

Furthermore, of course, in all exemplary embodiments according to the invention, other intermediate layers (not shown here) can be arranged between the intermediate layer 3 and one of the panes 1,2. This is particularly advantageous when the intermediate layer 3 has no adhesive properties, for example, a PET film, which are adhesively bonded to the panes 1, 2 via additional intermediate layers, made, for example, of PVB films. The glass fiber 4 is then routed, for example, through openings of the intermediate layer 3 or other intermediate layers.

FIG. 4 depicts a flowchart of an exemplary embodiment of the method according to the invention for producing a composite pane 10 according to the invention. The method according to the invention includes, for example, the following steps:

(a) Preparing a glass fiber 4, a thermoplastic intermediate layer 3, an outer pane 1 with an interior-side surface II, and an inner pane 2 with an exterior-side surface III;
(b) Introducing at least one opening 15 in the intermediate layer 3 and routing the glass fiber 4 through the opening 15,
(c) Arranging the intermediate layer 3 between the outer pane 1 and the inner pane 2;
(d) Bonding the interior-side surface II of the outer pane 1 to the exterior-side surface III of the inner pane 2 via the intermediate layer 3 by lamination.

LIST OF REFERENCE CHARACTERS

1 outer pane
2 inner pane
3 intermediate layer, thermoplastic intermediate layer
4 glass fiber
6 side edge 7 masking print
10 composite pane
15 opening
20 lighting means
100 composite pane arrangement
b width of the opening 15
d diameter of the light-diffusing glass fiber 4
A-A' section line
B-B' section line
P1, P2 arrow
Z detail
I exterior-side surface of the outer pane 1
II interior-side surface of the outer pane 1
III exterior-side surface of the inner pane 2
IV interior-side surface of the inner pane 2

The invention claimed is:

1. A composite pane, comprising:
an outer pane and an inner pane that are bonded to each other via a thermoplastic intermediate layer; and
a light-diffusing glass fiber that is suitable for emitting light by diffusion via a side wall along an extension length of the light-diffusing glass fiber, the light-diffusing glass fiber extending between the outer pane and the inner pane,
wherein
a first set of sections of the light-diffusing glass fiber along the extension length of the light-diffusing glass fiber are located between the thermoplastic intermediate layer and the outer pane,
a second set of sections of the light-diffusing glass fiber along the extension length of the light-diffusing glass fiber are located between the thermoplastic intermediate layer and the inner pane, and
a third set of sections of the light-diffusing glass fiber along the extension length of the light-diffusing glass fiber pass through the thermoplastic intermediate layer by way of one or more pass-through openings in the thermoplastic intermediate layer arranged throughout the thermoplastic intermediate layer,
whereby the light-diffusing glass fiber alternately extends, along an extension direction of the light-diffusing glass fiber, from a location between the thermoplastic intermediate layer and outer pane to a location between the thermoplastic intermediate layer and the inner pane and vice versa.

2. The composite pane according to claim 1, wherein the light-diffusing glass fiber is embedded in a surface of the thermoplastic intermediate layer.

3. The composite pane according to claim 1, wherein the one or more pass-through openings are a circular, elliptical, rectangular, or triangular recess, a punched hole, or a slot.

4. The composite pane according to claim 1, wherein a width of the one or more pass-through openings perpendicular to an extension direction of the light-diffusing glass fiber is from one time a diameter of the light-diffusing glass fiber up to 40 times the diameter of the light-diffusing glass fiber.

5. The composite pane according to claim 1, wherein a width of the one or more pass-through openings perpendicular to the extension direction of the light-diffusing glass fiber is from 0.5 mm to 10 mm.

6. The composite pane according to claim 1, wherein the one or more pass-through openings are two pass-through openings.

7. The composite pane according to claim 1, wherein the one or more pass-through openings are 3 to 100 pass-through openings.

8. The composite pane according to claim 1, wherein a distance between adjacent pass-through openings is from 0.5 cm to 50 cm.

9. The composite pane according to claim 1, further comprising:
a lighting means for coupling light into the light-diffusing glass fiber.

10. The composite pane according to claim 9, wherein the lighting means comprises a laser diode or a light-emitting diode.

11. A method for producing a composite pane, comprising:
preparing a light-diffusing glass fiber, a thermoplastic intermediate layer having a first surface and a second surface, an outer pane with an interior side surface, and an inner pane with an exterior side surface;
forming one or more pass-through openings in the thermoplastic intermediate layer;
routing the light-diffusing glass fiber through the one or more pass-through openings of the thermoplastic intermediate layer, thus obtaining a routed light-diffusing glass fiber having first sections on the first surface and second sections on the second surface;
arranging the thermoplastic intermediate layer between the outer pane and the inner pane; and
bonding the interior side surface of the outer pane to the exterior side surface of the inner pane via the thermoplastic intermediate layer by lamination, thus forming a composite pane having the first sections of the light-diffusing glass fiber between the thermoplastic intermediate layer and the outer pane and having the second sections of the light-diffusing glass fiber between the thermoplastic intermediate layer and the inner pane.

12. The method according to claim 11, wherein the one or more pass-through openings are formed by punching.

13. The method according to claim 11, wherein the one or more pass-through openings are formed by cutting the thermoplastic intermediate layer.

14. The method according to claim 11, wherein the one or more pass-through openings have a width perpendicular to an extension direction of the light-diffusing glass fiber of 0.5 mm to 10 mm.

15. The method according to claim 11, further comprising:
using the composite pane in transportation means for travel on land, in air, or on water.

16. The method according to claim 15, wherein the transportation means is selected from the group comprising a train, a watercraft, and a motor vehicle.

17. The method according to claim 16, wherein the composite pane is used in the motor vehicle as a windshield, rear window, or side pane.

18. The method according to claim 15, wherein the composite pane is used as roof panel in buildings.

19. The method according to claim 11, further comprising:
using a lighting means for an identification of an electrical function of the composite pane, wherein the electrical function is not an operation of the lighting means itself.

20. The method according to claim 19, wherein the lighting means is used for the identification of heating of the composite pane.

21. The method according to claim 19, wherein the lighting means is used for an identification of movement of the composite pane.

22. The method according to claim 19, wherein the lighting means is used for an identification of opening or closing of a side window.

23. The method according to claim 19, wherein the lighting means is used for an identification of locking or unlocking of a door or of a window of a vehicle.

* * * * *